United States Patent [19]

Halstead-Nussloch et al.

[11] Patent Number: 5,337,347
[45] Date of Patent: Aug. 9, 1994

[54] METHOD AND SYSTEM FOR PROGRESSIVE DATABASE SEARCH TERMINATION AND DYNAMIC INFORMATION PRESENTATION UTILIZING TELEPHONE KEYPAD INPUT

[75] Inventors: Richard H. Halstead-Nussloch, Roswell; Mark D. Strickert, Marietta, both of Ga.

[73] Assignee: International Business Machines Corporation, Armonk, N.Y.

[21] Appl. No.: 904,415

[22] Filed: Jun. 25, 1992

[51] Int. Cl.$^5$ .......................................... H04M 11/08
[52] U.S. Cl. ........................................ 379/67; 379/88; 379/97
[58] Field of Search ...................... 379/67, 88, 89, 97, 379/213

[56] References Cited

U.S. PATENT DOCUMENTS

| | | | |
|---|---|---|---|
| 4,649,563 | 3/1987 | Riskin | 379/97 |
| 4,677,659 | 6/1987 | Dargan | 379/97 |
| 4,782,509 | 11/1988 | Shepard | 379/97 |
| 4,799,254 | 1/1989 | Dayton et al. | 379/97 |
| 4,817,129 | 3/1989 | Riskin | 379/88 |
| 4,866,759 | 9/1989 | Riskin | 379/97 |
| 4,942,616 | 7/1990 | Linstroth et al. | 381/51 |
| 5,016,270 | 5/1991 | Katz | 379/92 |
| 5,052,038 | 9/1991 | Shepard | 379/88 |

OTHER PUBLICATIONS

IBM Technical Disc. Bulletin vol. 25 No. 7A, Dec. 1982, S. J. Boies et al. "User Interface For Audio Communication System" pp. 3371–3372.

IBM Technical Disc. Bulletin vol. 23 No. 7B, Dec. 1980, R. L. Rosenfeld "Home (Computer) Terminal Musical Program Selection" pp. 3440–3441.

*Primary Examiner*—James L. Dwyer
*Assistant Examiner*—Fan Tsang
*Attorney, Agent, or Firm*—J. F. Villella, Jr.; Duke W. Yee; Andrew J. Dillon

[57] ABSTRACT

A method and system are disclosed for searching a remote database utilizing a telephone device in communication with a data processing system. The data processing system has access to the remote database and the telephone device includes transmitter components for transmitting dual-tone multifrequency signals, wherein the dual-tone multifrequency signals are generated manipulating a keypad associated with the telephone device. The keypad has individually depressible alpha-numeric keys that may be utilized to generate a query and to send commands to the data processing system. The method of the present invention includes prompting the user to enter a query utilizing the depressible alpha-numeric keys on the keypad. As the query is input from the user, the data processing system searches the database to locate entries within the database corresponding to current state of the query. As the user enters additional data to modify the query, the database is searched for entries corresponding to the each modification of the query entered by the user. The user might or might not be prompted for each modification of the query. These steps of modifying the query and performing a search based on the modified query are repeated until the entries found are less than some predetermined number. At any time, an early termination command generated by the user may be utilized to immediately terminate the steps. In response to the number of entries being less than to the predetermined number or receiving the early termination command, the entries may be presented to the user via the telephone device.

20 Claims, 4 Drawing Sheets

METHOD AND SYSTEM FOR PROGRESSIVE DATABASE SEARCH TERMINATION AND DYNAMIC INFORMATION PRESENTATION UTILIZING TELEPHONE KEYPAD INPUT

BACKGROUND OF THE INVENTION

1. Technical Field

The present invention relates in general to an improved method and system for accessing a database and in particular, to an improved method and system for accessing a database utilizing a telephone device. Still more particularly, the present invention provides an improved method and system for accessing a database with a telephone device through an progressive search termination system.

2. Description of the Related Art

Typically, data processing systems connected to a database may provide information to remote locations through a telephone communications network, connecting the data processing system and a telephone device at the remote location. The telephone device located at a remote location typically contains a telephone keypad, which has individually depressible alpha-numeric keys. Each alpha-numeric key represents a single number and a plurality of letters of the alphabet. For example, the number "2" alpha-numeric key also represents the alphabetical letters "A", "B", and "C", and the number "3" alpha-numeric key represents the alphabetical letters "D", "E", and "F". A query may be formulated by manipulating these individually depressible alpha-numeric keys in a selected sequence in order to transmit questions and requests for information from the remotely located database. In response to receiving a query from a user at a telephone device, known data processing systems search the database and provide a response utilizing a synthesized voice that is transmitted to the user via the telephone device. "Synthesized voice" means digital to analogue playback of a pre-recorded human voice. Typically, the content of these responses is restricted to pre-recorded segments, and their composition is likewise typically fixed.

This type of system for retrieving information from a remote database utilizing a telephone device is adequate in those cases where the user enters a query requiring only numerical input. In cases where alphabetical input is utilized, retrieval of information may be more problematic since each dual-tone multifrequency ("DTMF") tone represents multiple alphabetical characters. For example, in a directory type database, a user's input may generate numerous entries which correspond to the sequence of keys entered by the user at the telephone device, since each key represents multiple alphabetical characters. After entering a fixed-length query, these multiple entries are typically presented to the user in some manner, allowing the user to choose an entry. Or, alternatively, the user is forced to continue entering the query until the item of choice is uniquely identified, which requires many keystrokes.

Occasionally after entering a query, the user may desire to change or abandon the query; however, the user must generally give control to the system and e.g.; wait until all the corresponding entries are found by the data processing system and presented via the telephone device. In other cases, the user may wish to determine how many entries matching the query have been found thus far, in order to determine whether or not to continue or to modify the query. When only a few matching entries exist, this is not a problem. In those instances, however, where the entries corresponding to a user's query are numerous, i.e., 10, 20, 30, or 40 entries, presenting these entries before allowing modifications to the user's query becomes very cumbersome and unwieldy.

Consequently, it would be desirable to have an improved method and system for providing a user access to a database utilizing a telephone device without subjecting the user to an unwanted presentation of large numbers of entries corresponding to the user's fixed-length query, or forcing the user to enter many keystrokes to uniquely identify the desired item.

SUMMARY OF THE INVENTION

It is therefore one object of the present invention to provide an improved method and system for accessing a database.

It is another object of the present invention to provide an improved method and system for accessing a database utilizing a telephone device.

It is yet another object of the present invention to provide an improved method and system for accessing a database with a telephone device through progressive search termination system.

The foregoing objects are achieved as is now described. A method and system are disclosed for searching a remote database utilizing a telephone device which is in communication with a data processing system. The data processing system has access to a remote database and the telephone device includes transmitter components for transmitting dual-tone multifrequency signals in response to a user manipulating a keypad associated with the telephone device. The keypad has individually depressible alpha-numeric keys that may be utilized to generate a query and to send commands to the data processing system. The method of the present invention includes prompting the user to enter a query utilizing the depressible alpha-numeric keys on the keypad. As the query is input from the user, the data processing system searches the database to locate entries within the database corresponding to the current state of the query. As the user enters additional data to modify the query, the database is searched for matching entries corresponding to each modification of the query entered by the user. The user might or might not be prompted for each modification of the query. These steps of modifying the query and performing a search based on the modified query are repeated until the matching entries found are less than some predetermined number. At any time during the process an early termination command generated by the user may be utilized to immediately terminate the process. Additionally, in response to the number of matching entries being less than the predetermined number or in response to receiving the early termination command, matching entries may be presented to the user via the telephone device.

Alternatively, in response to an early termination command, the data processing system may present the number of matching entries found, if the number of entries are not less than a predetermined number. The user may thereafter be prompted to continue narrowing the query.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
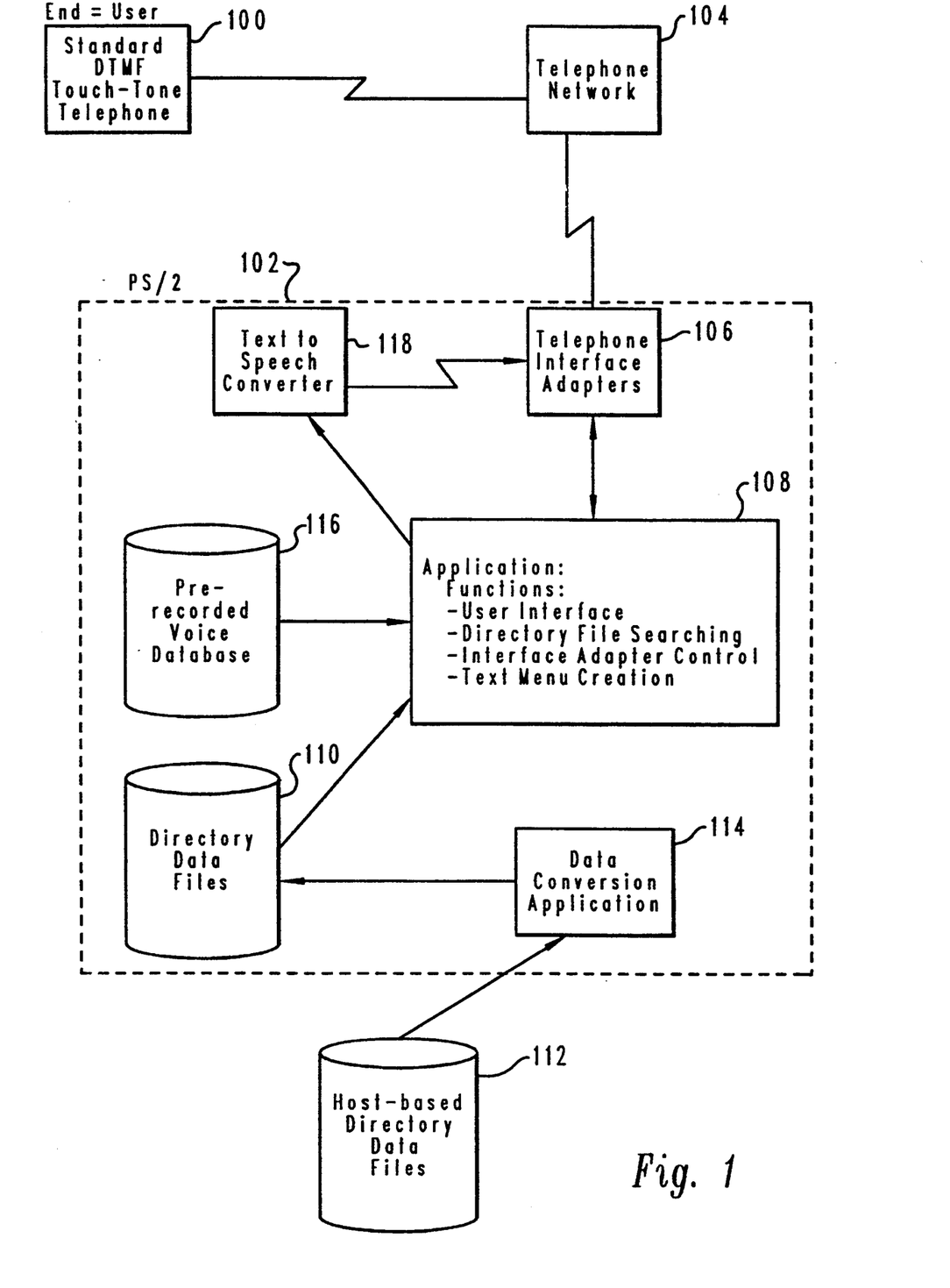
FIG. 1 depicts a high level block diagram of a system constructed in accordance with a preferred embodiment of the present invention.

With reference now to the figures and in particular with reference to FIG. 1, there is depicted a high level block diagram of a system constructed in accordance with a preferred embodiment of the present invention. As illustrated, a user may employ telephone device 100 to access data processing system 102. Telephone device 100 is preferably a standard DTMF Touch-Tone telephone. Touch-Tone is a registered trademark of American Telephone and Telegraph Company. Communication between telephone device 100 and data processing system 102 is provided by telephone network 104.

Data processing system 102 also includes telephone interface adapter 106, which is utilized to receive transmissions from telephone device 100 traveling through telephone network 104. Data processing system 102 may be a so called "personal" computer such as a PS/2 computer, or some other computer. PS/2 is a registered trademark of International Business Machines Corporation. Upon receiving a DTMF transmission or a query from telephone device 100, telephone interface adapter 106 relays the query to application 108, which performs various functions including user interface, directory file searching, interface adapter control, and text menu creation.

Application 108 may access directory data files 110 located in data processing system 102 in order to search for entries corresponding to the query sent by user at telephone device 100. Directory data files 110 may be stored within data processing system 102 in a mass storage device such as a hard disk drive. Additionally, directory data files 110 may be updated with additional information from, e.g., host-based directory data files 112 located in a mass storage device outside of data processing system 102. Host-based directory data files 112 may be modified by data conversion application 114 into a format usable by application 108. For example, data conversion application 114 may code the data into DTMF number sequences.

Entries corresponding to the user's query may be sent by application 108 through telephone interface adapter 106 and telephone network 104 to the user at telephone device 100. These entries are presented to the user in an audible form. This auditory presentation may be accomplished by utilizing messages located in prerecorded voice database 116, which contains a predefined set of messages stored in this database. In addition or alternatively, entries corresponding to the user's query found by searching directory data files 108 may be audibly presented to the user at telephone device 100 by directly converting selected data fields in the entries, e.g., name field or department field, from a text format to a speech format at text-to-speech converter 118.

Figure 2:
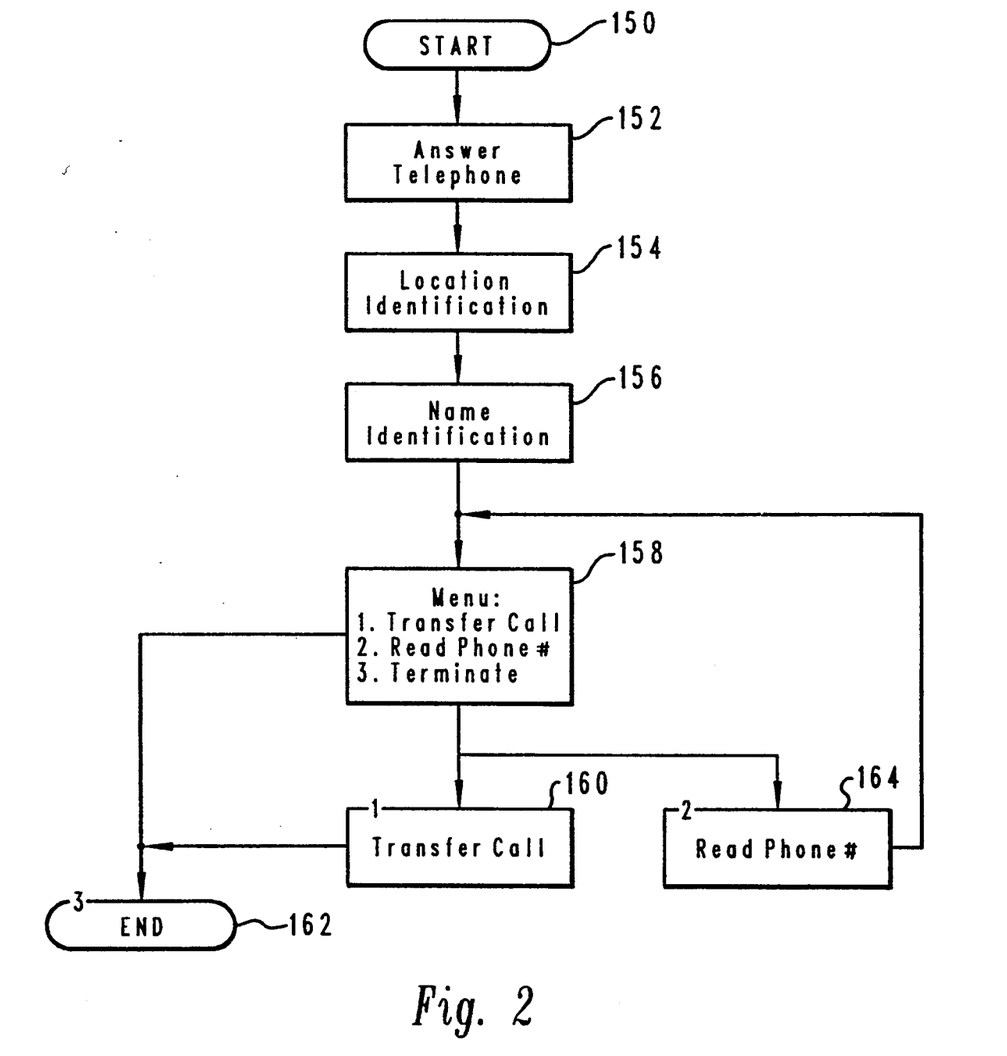
FIG. 2 is a high level logic flowchart of a progressive database search termination with menu method for searching a personnel directory database.

Referring now to FIG. 2, there is depicted a high level logic flowchart of a progressive database search termination with menu method for searching a personnel directory database. As illustrated, the process begins in block 150 and thereafter proceeds to block 152, which depicts the answering of a telephone call originating from a user utilizing a telephone device at a remote location. Next, block 154 illustrates location identification. This identification involves determining the location that the user desires to access. For example, the user may be trying to obtain the phone number of a person located in Atlanta, Ga. To identify the desired location, the user would manipulate the alpha-numeric keys located on the keypad of the telephone device to indicate the location.

The data processing system would receive the query entered through keystrokes by the user manipulating individually depressible alpha-numeric keys in the form of DTMF tones and audibly provide the user with a menu containing the entries found corresponding to the user's query, allowing the user to choose the desired entry from a list or menu of entries corresponding to the user's query. A query may be one keystroke or an entire field formed by a number of keystrokes. Modifying a query involves either entering additional keystrokes to a data field, adding data fields, or changing existing data fields. This process is described in more detail in FIG. 3. Thereafter, the process proceeds to block 156, which depicts name identification, which involves determining the person who the user wishes to contact. This block is also described in more detail in FIG. 3.

Subsequently after the location and name are identified, the process proceeds to block 158, which illustrates a determination by the user of what action is taken, e.g., whether or not to transfer the call to the person identified or have the phone number audibly read to the user. These choices are presented to the user in the form of an audible menu. If the user chooses to transfer the call to the person identified, the process then proceeds to block 160, which depicts the transferring of the call. After transferring the call, the process terminates as illustrated in block 162.

Referring back to block 158, if the user chooses to have the phone number audibly read, the process then proceeds to block 164, which depicts the data processing system audibly presenting the phone number to the user at the telephone device. In accordance with a preferred embodiment of the present invention, the phone number may be presented to the user utilizing a text-to-speech convertor as the delivery mechanism. Alternatively, the phone number may be presented in an audible fashion to the user by utilizing prerecorded segments arranged in a manner such that the phone number may be presented to the user at the telephone device. Thereafter, the process returns to block 158. Referring again to block 158, if the user chooses the terminate option from the menu, the process terminates as depicted in block 162.

Figure 3:
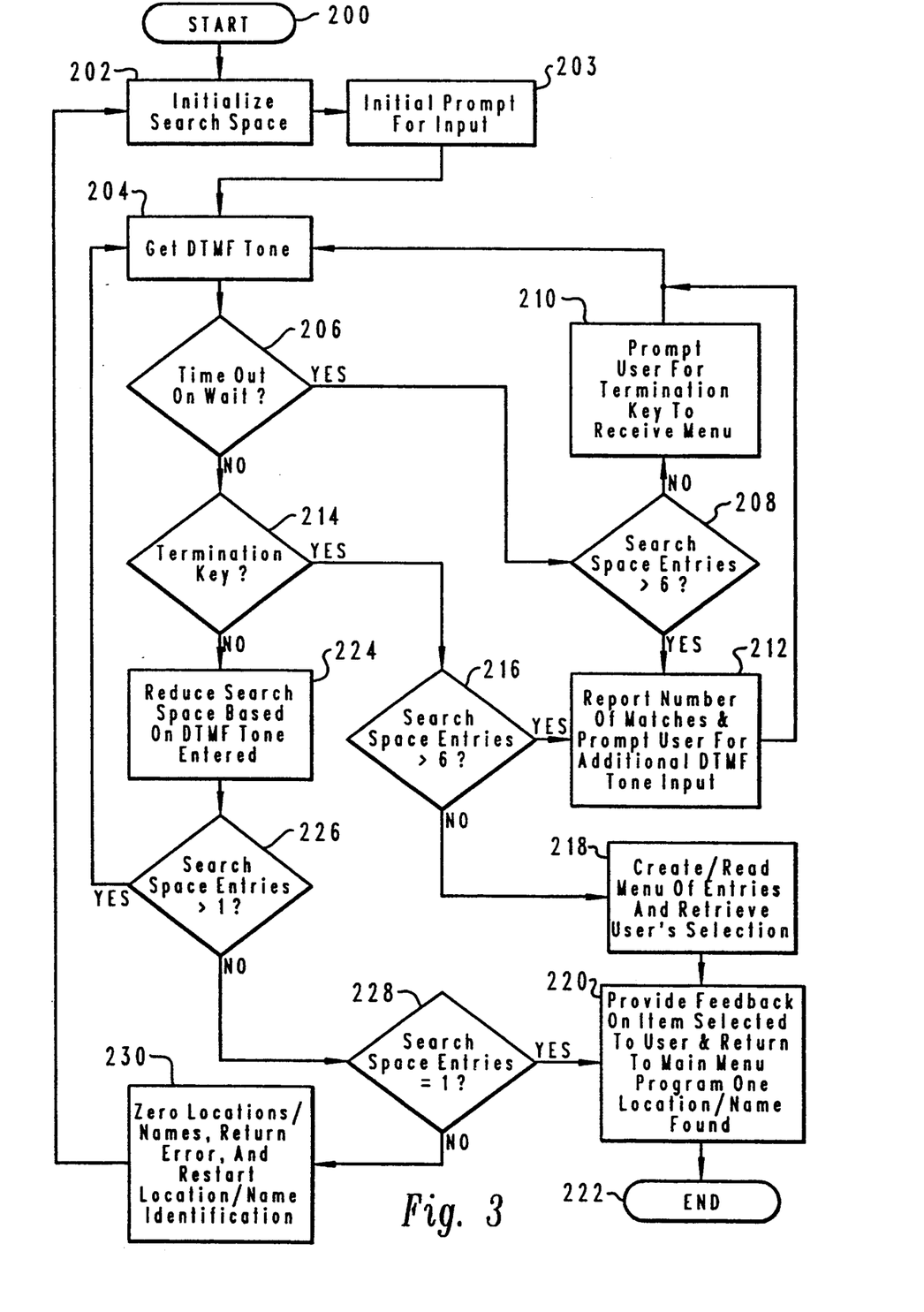
FIG. 3 depicts a high level logic flowchart of the process utilized for location identification and for name identification in the personnel directory database illustrated in FIG. 2.

With reference now to FIG. 3, there is depicted a high level logic flowchart of the process utilized in block 154 for location identification and in block 156 for name identification. Both location and name identification follow the same process in the depicted embodiment.

In location identification, the user manipulates the alpha-numeric keys to indicate the location that the user desires to access. For example, if a user desires to find a person in Massachusetts, the data processing system would prompt the user to enter the state desired. The user would begin entering the requested information by pressing the alpha-numeric key 6 to transmit a DTMF tone. This key represents the alphabetical characters "M", "N", and "O". Upon receiving the DTMF tone generated by this key, the data processing system determines that the following states fall into this entry: Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma, and Oregon. In a preferred embodiment of the present invention, the data processing system awaits another DTMF tone signal in order to narrow down the number of entries to less than seven.

When the user enters the "2" key, representing the alphabetical characters "A", "B", and "C", the number of entries corresponding to the user's query are reduced to: Maine, Maryland, and Massachusetts. If the user chooses to terminate the search at this point, these entries are audibly presented to the user in a menu form: "Three states match your input: for Maine press 1, for Maryland press 2, for Massachusetts press 3." The user would press "3" to choose Massachusetts. Alternatively, postal abbreviations may be used to select states.

The query in this example is made by a single key stroke transmitting a DTMF tone. The query is modified by pressing another alpha-numeric key. In an alternative embodiment a query may be an entire data field, i.e., multiple key strokes, that may be modified by changing the data field entered or adding another data field.

As illustrated, the process begins in block 200 and thereafter proceeds to block 202, which depicts the initialization of the search space. In initializing the search space, the data processing system sets aside space or memory needed to perform searching and to store the results from searching the database for entries corresponding to the query presented by a user. Entries include, for example, items, records, data fields, or files found in the database that correspond or fit the query presented by a user. For example, the locations: Maine, Maryland, and Massachusetts from the above described example are entries corresponding to the user's query. The process then proceeds to block 203, which illustrates an initial prompt to the user for input.

Next, the process proceeds to block 204, which illustrates the obtaining of the DTMF tone entered by the user at the telephone device. The process will wait at block 204 for a DTMF tone to be entered by the user for a predetermined amount of time; e.g., 6 seconds. If the user enters the DTMF tone prior to the predetermined amount of time, the process continues, without any further delay, to block 206, which depicts a determination of whether or not a "time-out on wait" exists. A "time-out on wait" exists in accordance with a preferred embodiment of the present invention if the user has not entered a DTMF tone within the predetermined amount of time.

If a "time-out on wait" does exist, the process then proceeds to block 208, which illustrates a determination of whether or not the search space entries are greater than six, i.e., the number of entries found when the user pressed the "6" key in the example above. It will be apparent to those of ordinary skill in the art that various numbers may be utilized in this determination other than six entries. If six entries do not exist, the process then proceeds to block 210, which depicts prompting the user to press the termination key to receive the menu of entries found by the search. For example, the data processing system may utilize synthetic speech to prompt the user to press the "#" key on the keypad. Thereafter, the process returns to block 204.

Referring back to block 208, if the number of search space entries are greater than six, the process then proceeds to block 212, which illustrates reporting the number of matches and prompting the user for additional DTMF tone input. For example, the data processing system may prompt the user to enter data utilizing a prerecorded message such as: "Currently, 10 states match your input. Please continue to enter the next letter of the state you wish to access." Alternatively, the process may prompt the user to continue entering data by tone or beep. Thereafter, the process returns to block 204.

Referring back to block 206, if a time-out on wait does not exist, the process then proceeds to block 214, which depicts a determination of whether or not the termination key has been pressed by the user. If the termination key has been pressed by the user, the process then proceeds to block 216, which illustrates a determination of whether or not the number of search space entries are greater than six. If the number of search space entries are greater than six, the process then proceeds to block 212, which depicts the reporting of the number of matches and prompting the user for additional DTMF tone input. Thereafter, the process returns to block 204.

Referring back to block 216, if the number of search space entries are not greater than six, the process then proceeds to block 218, which depicts the creating and reading of a menu of entries corresponding to the user's query and the retrieval of the user's selection. Thereafter, the process proceeds to block 220, which illustrates the providing of feedback on the item selected to the user and then returning of the one location/name found to the main menu program. The process then terminates as depicted in block 222.

Referring back to block 214, if the termination key has not been pressed by the user, the process then proceeds to block 224, which illustrates reducing the search space based on the DTMF tone entered by the user. Block 226 depicts a determination of whether or not the number search space entries are greater than one. If search space entries are greater than one, the process returns to block 204. If search space entries are not greater than one, the process then proceeds to block 228, which illustrates a determination of whether or not the number of search space entries are equal to one.

If search space entries are not equal to one, the process then proceeds to block 230, which depicts zero locations/names match the user's query and returns an error to the user and restarts the location/name identification process at block 202.

Referring back to block 228, if it is determined that the number of search space entries are equal to one, one location/name has been found and the process then proceeds to block 220, which illustrates the feedback to the user on the selected item and the returning of that one location or name entry to the main menu program. Thereafter, the process terminates as depicted in block 222.

The depicted embodiment will prompt the user for additional input if the user presses the termination key and more than six entries exist. In another preferred embodiment of the present invention, in response to the user pressing the termination key, the process may automatically present the entries to the user even though more than six entries have been found. In such an embodiment, if the data processing system determined that the termination key has been pressed in block 214, the process proceeds to block 218, which depicts the creation and reading of a menu of entries found and retrieving the user's selection. In this embodiment block 216 would be eliminated.

Alternatively, the data processing system may audibly tell the user how many entries were found and give the user a choice as to whether to continue narrowing the search or to present all the entries found thus far in accordance with a preferred embodiment of the present invention.

Figure 4:
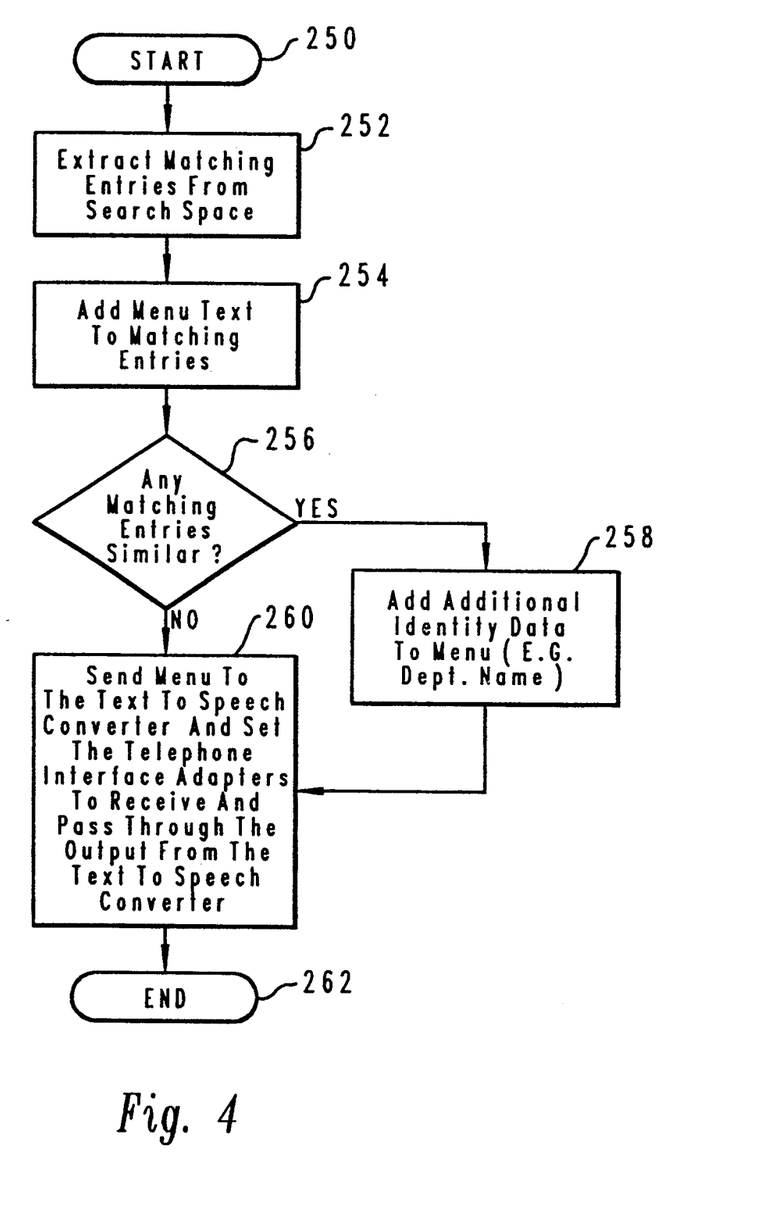
FIG. 4 is a high level logic flowchart illustrating the creation and audible presentation of a menu of entries and retrieval of a user's selection in the personnel directory database illustrated in FIG. 3.

Referring now to FIG. 4, there is depicted a high level logic flowchart illustrating the creation and audible presentation of a menu listing the entries and retrieving a user's selection as illustrated in block 218 in FIG. 3. The menus, the output, and the prompts audibly presented to a user are all dynamically produced according to data or input received from the user. As depicted, the process begins in block 250 and thereafter proceeds to block 252, which illustrates the extraction of name fields from entries corresponding to the user's query from the search space. Thereafter, the process proceeds to block 254, which depicts the addition of menu text to entries extracted. Menu text is text placed around an entry for audible presentation to the user through text to speech conversion. For example, speech conversion of the name field in the extracted entry, John Smith, and the menu text would be audibly presented to the user at the telephone device as "For John Smith, please press 1". The menu text added to the name field in this example are the words "For" and "please press 1".

Next, after adding the menu text to the name fields of matching entries, the process proceeds to block 256, which illustrates a determination of whether or not any of the name fields in extracted entries are similar. In some cases, the name fields from extracted entries may be similar. For example, two John Smiths may be located at the same site. If extracted name fields are similar, the process then proceeds to block 258, which depicts adding additional identity data to the menu to differentiate the entries. For example, department names from the department fields of the entries could be added to distinguish between multiple similar entries. The menu audibly presented through text to speech conversion to the user would, for example, be as follows: "For John Smith in Marketing, please press 1; for John Smith in Production, please press 2". In this example, the two entries were identical. The same procedure would be employed for similar entries such as William Smith and Will Smith. In accordance with a preferred embodiment of the present invention, the above-described menu is dynamically produced depending on the data entered by a user.

After audibly presenting the menu to the user, the process proceeds to block 260, which illustrates the sending of the menu to the text-to-speech converter and the setting of the telephone interface adapters to receive and pass through the output from the text-to-speech converter to the user at the telephone device. Thereafter, the process terminates as depicted in block 262. It will be apparent to those of ordinary skill in the art that other methods of transferring output from a text-to-speech converter to the user may be utilized.

One advantage of the embodiment described above is that it provides a progressive database search termination method for interpreting and utilizing keypad input of an alpha-numeric nature. In accordance with a preferred embodiment of the present invention, the present method and system operates by utilizing a search space, which is successively reduced as the user enters more input. Furthermore, at any point during input in accordance with a preferred embodiment of the present invention, the user may press a termination key (e.g. the "#" key) on the keypad to terminate the search process. In response to a termination command, an auditory message will inform the user of a number of entries found for the entered search string, or in the case in which six or fewer entries are present, an auditory menu may be presented to the user. Alternatively, the data processing system may audibly present all of the entries found thus far to the user without checking the number of entries found. Importantly, the user is able to terminate the search at any point in time in accordance with a preferred embodiment of the present invention. Additionally, the described embodiment depicts the implementation of dynamic content and composition of, e.g., output, menus, and prompts to the user.

Additionally, although the presently described embodiment depicts the searching for name and location identities in a personal directory, the method and system in accordance with a preferred embodiment of the present invention may be utilized to search any database, which may be indexed utilizing alpha-numeric input.

While the invention has been particularly shown and described with reference to a preferred embodiment, it will be understood by those skilled in the art that various changes in form and detail may be made therein without departing from the spirit and scope of the invention.

What is claimed is:

1. A method for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said method comprising:

(a) prompting said user to enter a query utilizing said plurality of individually depressible alpha-numeric keys on said keypad;
   (b) searching said database to locate entries within said database corresponding to said query in response to receiving said query at said data processing system;

(c) prompting said user to enter additional data to modify said query;

(d) searching said database for entries corresponding to said query as modified by said additional data entered by said user, wherein a number of entries are located;

(e) repeating steps (c) through (d) until said number of entries is less than a predetermined number;

(f) in response to receiving an early termination command generated by said user, terminating steps (c) through (e); and (g) in response to said number of entries being less than a predetermined number or receiving said early termination command, audibly presenting said entries to said user via said telephone device.

2. The method of claim 1 wherein said step of audibly presenting said entries to said user via said telephone device includes converting the entries from text to speech.

3. A method for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said method comprising:

(a) prompting said user to enter a query utilizing said plurality of individually depressible alpha-numeric keys on said keypad;

(b) searching said database to locate entries within said database corresponding to said query in response to receiving said query at said data processing system;

(c) prompting said user to enter additional data to modify said query;

(d) searching said database for entries corresponding to said query as modified by said additional data entered by said user, wherein a number of entries are located;

(e) repeating steps (c) through (d) until said number of entries is less than 7;

(f) in response to receiving an early termination command generated by said user, terminating steps (c) through (e); and (g) in response to said number of entries being less than 7 or receiving said early termination command, audibly presenting said entries to said user via said telephone device, wherein said step of audibly presenting said entries to said user via said telephone device includes converting the entries from text to speech.

4. The method of claim 2, wherein said step of prompting said user to enter additional data includes waiting for a selected period of time for additional data to be entered by said user and if additional data has not been entered, audibly prompting said user to enter additional data after said period of time.

5. A method for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said method comprising:

(a) prompting said user to enter a query utilizing said plurality of individually depressible alpha-numeric keys on said keypad;

(b) searching said database to locate entries within said database corresponding to said query in response to receiving said query at said data processing system;

(c) prompting said user to enter additional data to modify said query;

(d) searching said database for entries corresponding to said query as modified by said additional data entered by said user, wherein a number of entries are located;

(e) repeating steps (c) through (d) until said number of entries is less than a predetermined number;

(f) in response to receiving an early termination command generated by said user, terminating steps (c) through (e); and (g) in response to said number of entries being less than a predetermined number or receiving said early termination command, audibly presenting said entries to said user via said telephone device, wherein said step of audibly presenting said entries to said user via said telephone device includes converting the entries from text to speech;

wherein each entry has a plurality of data fields contained therein, wherein each data field contains text, and said step of audibly presenting said entries to said user comprises dynamically creating a menu utilizing text from selected data fields in said entries found during said step of searching said database for entries corresponding to said query as modified, and audibly presenting said menu to said user by converting said text to speech.

6. A method for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said method comprising:

(a) prompting said user to enter a query utilizing said plurality of individually depressible alpha-numeric keys on said keypad;

(b) searching said database to locate entries within said database corresponding to said query in response to receiving said query at said data processing system;

(c) prompting said user to enter additional data to modify said query;

(d) searching said database for entries corresponding to said query as modified by said additional data entered by said user, wherein a number of entries are located;

(e) repeating steps (c) through (d) until said number of entries is less than a predetermined number;

(f) in response to receiving an early termination command generated by said user, terminating steps (c) through (e); and (g) in response to said number of entries being less than a predetermined number or receiving said early termination command, audibly presenting said entries to said user via said telephone device, wherein said step of audibly presenting said entries to said user via said telephone device includes converting the entries from text to speech; wherein each entry has a plurality of data fields contained therein, wherein each data field contains text, and wherein said presenting step comprises dynamically creating a menu utilizing text from selected data fields in said entries found during said searching step; in response to a presence of identical data in said selected data fields for said entries in said menu, adding text from additional data fields from said entries that include identical data in said selected data fields to said menu to produce a modified menu that distinguishes said entries having identical data in said selected data fields in said menu; and audibly presenting said modified menu to said user utilizing a text to speech conversion.

7. A method for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said method comprising:
  (a) prompting said user to enter a query utilizing said plurality of individually depressible alpha-numeric keys on said keypad;
  (b) searching said database to locate entries within said database corresponding to said query in response to receiving said query at said data processing system;
  (c) prompting said user to enter additional data to modify said query;
  (d) searching said database for entries corresponding to said query as modified by said additional data entered by said user, wherein a number of entries are located;
  (e) repeating steps (c) through (d) until said number of entries is less than a predetermined number;
  (f) in response to receiving an early termination command generated by said user, terminating steps (c) through (e); and
  (g) in response to said number of entries being less than a predetermined number or receiving said early termination command, audibly presenting said entries to said user via said telephone device, wherein said step of audibly presenting said entries to said user via said telephone device includes converting the entries from text to speech;
wherein said step of prompting prompting said user to enter additional data includes dynamically creating a menu of choices based on entries found and presenting said menu of choices to said user utilizing a text to speech conversion.

8. A method for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said method comprising:
  (a) prompting said user to enter a query utilizing said plurality of individually depressible alpha-numeric keys on said keypad;
  (b) searching said database to locate entries within said database corresponding to said query in response to receiving said query at said data processing system;
  (c) prompting said user to enter additional data to modify said query;
  (d) searching said database for entries corresponding to said query as modified by said additional data entered by said user, wherein a number of entries are located;
  (e) repeating steps (c) through (d) until said number of entries is less than a predetermined number, wherein said entries are audibly presented to said user via said telephone device; and
  (f) in response to receiving an early termination command generated by said user, terminating steps (c) through (e) and audibly presenting said entries to said user.

9. The method of claim 8 further comprising:
in response to receiving said early termination command, audibly presenting said entries to said user via said telephone device.

10. A method for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said method comprising:
  (a) prompting said user to enter a query utilizing said plurality of individually depressible alpha-numeric keys on said keypad;
  (b) searching said database to locate entries within said database corresponding to said query in response to receiving said query at said data processing system;
  (c) prompting said user to enter additional data to modify said query;
  (d) searching said database for entries corresponding to said query as modified by said additional data entered by said user, wherein a number of entries are located;
  (e) repeating steps (c) through (d) until said number of entries is less than a predetermined number, wherein said entries are audibly presented to said user via said telephone device;
  (f) in response to receiving an early termination command generated by said user, terminating steps (c) through (e);
  (g) in response to receiving said early termination command and if said number of entries is greater than or equal to said predetermined number, presenting said number of entries to said user and prompting said user to choose between modifying said query and audibly receiving said entries via said telephone device; and (h) in response to receiving said early termination command and if said number of entries is less than said predetermined number, audibly presenting said entries to said user via said telephone device.

11. The method of claim 10, wherein said predetermined number is 7.

12. A data processing system for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said data processing system comprising:

means for prompting said user to enter a query utilizing said plurality of individually depressible alpha-numeric keys on said keypad;

first searching means for searching said database to locate entries within said database corresponding to said query in response to receiving said query at said data processing system, wherein a number of entries from within said database are located and said first search means may be terminated in response to receiving an early termination command generated by said user;

means for prompting said user to enter additional data to modify said query;

second searching means for searching said database for entries corresponding to said query as modified by said additional data entered by said user until said number of entries is less than a predetermined number;

means for terminating said second searching means in response receiving to an early termination command generated by said user; and means for audibly presenting said number of entries to said user via said telephone device in response to said number of entries being less than a predetermined number or receiving said early termination command.

13. The data processing system of claim 12 wherein said means for audibly presenting said entries to said user via said telephone device includes means for converting said entries to audible speech.

14. A data processing system for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said data processing system comprising:

means for prompting said user to enter a query utilizing said plurality of individually depressible alpha-numeric keys on said keypad;

first searching means for searching said database to locate entries within said database corresponding to said query in response to receiving said query at said data processing system, wherein a number of entries from within said database are located;

means for prompting said user to enter additional data to modify said query;

second searching means for searching said database for entries corresponding to said query as modified by said additional data entered by said user until said number of entries is less than 7;

means for terminating said first and second searching means in response receiving to an early termination command generated by said user; and means for audibly presenting said number of entries to said user via said telephone device in response to said number of entries being less than 7 or receiving said early termination command, wherein said means for audibly presenting said entries to said user via said telephone device includes means for converting said entries to audible speech.

15. The data processing system of claim 12, wherein said means for prompting includes means for waiting for a selected period of time for additional data to be entered by said user and if additional data has not been entered, means for audibly prompting said user to enter additional data after said period of time.

16. A data processing system for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said data processing system comprising:

means for prompting said user to enter a query utilizing said plurality of individually depressible alpha-numeric keys on said keypad;

first searching means for searching said database to locate entries within said database corresponding to said query in response to receiving said query at said data processing system, wherein a number of entries from within said database are located;

means for prompting said user to enter additional data to modify said query;

second searching means for searching said database for entries corresponding to said query as modified by said additional data entered by said user until said number of entries is less than a predetermined number;

means for terminating said first and second searching means in response receiving to an early termination command generated by said user; and means for audibly presenting said number of entries to said user via said telephone device in response to said number of entries being less than a predetermined number or receiving said early termination command;

wherein each entry has a plurality of data fields contained therein, wherein each data field contains text, and said means for audibly presenting comprises means for dynamically creating a menu utilizing text from selected data fields in said entries found by said means for searching, and means for audibly presenting said menu to said user by converting said text to speech.

17. A data processing system for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said data processing system comprising:

means for prompting said user to enter a query utilizing said plurality of individually depressible alpha-numeric keys on said keypad;

first searching means for searching said database to locate entries within said database corresponding to said query in response to receiving said query at said data processing system, wherein a number of entries from within said database are located;

means for prompting said user to enter additional data to modify said query;

second searching means for searching said database for entries corresponding to said query as modified by said additional data entered by said user until said number of entries is less than a predetermined number;

means for terminating said first and second searching means in response receiving to an early termination command generated by said user; and     means for audibly presenting said number of entries to said user via said telephone device in response to said number of entries being less than a predetermined number or receiving said early termination command;

wherein each entry has a plurality of data fields contained therein, wherein each data field contains text, and wherein said means for presenting comprises means for dynamically creating a menu utilizing text from selected data fields in said entries found by said second searching means; in response to a presence of identical data in said selected data fields in entries in said menu, means for adding text from additional data fields from said entries having identical data in said selected data fields to said menu to produce a modified menu that distinguishes said entries having identical data in said selected data fields in said menu; and means for audibly presenting said modified menu to said user utilizing a text to speech conversion.

18. A data processing system for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said data processing system comprising:

means for prompting said user to enter a query utilizing said plurality of individually depressible alpha-numeric keys on said keypad;

means for searching said database to locate entries within said database corresponding to said query in response to receiving said query at said data processing system, wherein a number of entries are located;

means for prompting said user to enter additional data to modify said query;

means for searching said database for entries corresponding to said query as modified by said additional data entered by said user until said number of entries is less than a predetermined number, wherein said entries are audibly presented to said user via said telephone device; and     means for terminating either searching means in response to receiving an early termination command generated by said user and for audibly presenting said entries to said user.

19. The system of claim 18 further comprising:

means for audibly presenting said entries to said user via said telephone device, in response to receiving said early termination command.

20. A data processing system for searching a database utilizing a telephone device in communication with a data processing system, said data processing system having access to said database, said telephone device having transmitter components for transmitting dual-tone multifrequency signals, wherein said dual-tone multifrequency signals are generated by a user manipulating a keypad associated with said telephone device, said keypad having a plurality of individually depressible alpha-numeric keys to generate a query and to send commands to said data processing system, said data processing system comprising:

means for prompting said user to enter a query utilizing said plurality of individually depressible alpha-numeric keys on said keypad;

first searching means for searching said database to locate entries within said database corresponding to said query in response to receiving said query at said data processing system, wherein a number of entries are located;

means for prompting said user to enter additional data to modify said query;

second searching means for searching said database for entries corresponding to said query as modified by said additional data entered by said user until said number of entries is less than a predetermined number;

means for terminating said second searching means in response to receiving an early termination command generated by said user;

means for audibly presenting said number of entries to said user and prompting said user to choose between modifying said query and audibly receiving said entries via said telephone device, in response to receiving said early termination command and if said number of entries is greater than or equal to said predetermined number; and     means for audibly presenting said entries to said user via said telephone device in response to receiving said early termination command and if said number of entries is less than said predetermined number.

* * * * *